US00RE48303E

(19) United States
(12) Reissued Patent
Lee et al.

(10) Patent Number: US RE48,303 E
(45) Date of Reissued Patent: *Nov. 10, 2020

(54) REFRIGERATOR AND APPARATUS FOR ICE DISCHARGING THEREIN

(71) Applicant: LG ELECTRONICS INC., Seoul (KR)

(72) Inventors: Nam Gi Lee, Seoul (KR); Seong Jae Kim, Seoul (KR); Chang Ho Seo, Seoul (KR)

(73) Assignee: LG Electronics Inc., Seoul (KR)

( * ) Notice: This patent is subject to a terminal disclaimer.

(21) Appl. No.: 15/954,114

(22) Filed: Apr. 16, 2018

Related U.S. Patent Documents

Reissue of:
(64) Patent No.: 8,746,002
Issued: Jun. 10, 2014
Appl. No.: 12/445,589
PCT Filed: Oct. 23, 2007
PCT No.: PCT/KR2007/005201
§ 371 (c)(1),
(2) Date: Apr. 15, 2009
PCT Pub. No.: WO2008/050991
PCT Pub. Date: May 2, 2008

U.S. Applications:
(63) Continuation of application No. 15/073,546, filed on Mar. 17, 2016, now Pat. No. Re. 46,794, which is an application for the reissue of Pat. No. 8,746,002.

(30) Foreign Application Priority Data

Oct. 24, 2006 (KR) ..... 10-2006-0103232

(51) Int. Cl.
*F25C 5/02* (2006.01)
*F25C 5/20* (2018.01)
*F25C 5/04* (2006.01)

(52) U.S. Cl.
CPC ..... *F25C 5/22* (2018.01); *F25C 5/046* (2013.01); *F25C 2400/08* (2013.01)

(58) Field of Classification Search
CPC ..... F25C 5/00; F25C 5/02; F25C 5/04; F25C 5/046; F25C 5/18; F25C 5/185;
(Continued)

(56) References Cited

U.S. PATENT DOCUMENTS 1,089,947 A 1/1914 Nims
3,602,441 A * 8/1971 Alvarez ..... 241/101.2
(Continued)

FOREIGN PATENT DOCUMENTS

CH 579894 A5 9/1976
CN 1683851 A 10/2005
(Continued)

OTHER PUBLICATIONS

Chinese Office Action in Chinese Application No. 200780039412.4, dated Feb. 12, 2010, 15 pages.
(Continued)

*Primary Examiner* — Patricia L Engle
(74) *Attorney, Agent, or Firm* — Fish & Richardson P.C.

(57) ABSTRACT

A refrigerator and a device for ice discharging are disclosed. The device for ice discharging includes a case having an ice introduction opening and an ice discharge opening (312); a rotation member (320) rotatable in the case to transfer ice that is held in a predetermined amount to be discharged; and a discharge adjustment part (340) spaced apart a predetermined space from the rotation member (320) to adjust the number of the ices transferred by the rotation member, such that a fixed amount of the ice is substantially discharged. The refrigerator includes the device for ice discharging therein.

5 Claims, 14 Drawing Sheets

(58) Field of Classification Search
CPC .... F25C 5/187; F25C 5/20; F25C 5/22; F25C 5/24; F25C 2400/04; F25C 2400/08; F25C 2400/10
See application file for complete search history.

(56) References Cited

U.S. PATENT DOCUMENTS

| | | | | |
|---|---|---|---|---|
| 4,084,725 | A | 4/1978 | Buchser | |
| 4,627,556 | A | 12/1986 | Brooks | |
| 4,942,979 | A | 7/1990 | Linstromberg | |
| 4,964,535 | A * | 10/1990 | Curwen | A01K 5/0275 119/56.1 |
| 4,993,364 | A * | 2/1991 | Hessenauer | A01K 5/0275 119/51.11 |
| 5,088,300 | A * | 2/1992 | Wessa | 62/340 |
| 5,303,672 | A * | 4/1994 | Morris | A01K 5/0291 119/51.11 |
| 6,010,037 | A * | 1/2000 | Thompson | 222/240 |
| 6,952,936 | B2 * | 10/2005 | Sannasi et al. | 62/344 |
| 7,017,364 | B2 * | 3/2006 | Lee et al. | 62/351 |
| 7,421,834 | B1 * | 9/2008 | Doolan | 53/570 |
| 7,748,230 | B2 * | 7/2010 | An | 62/320 |
| 2002/0020711 | A1 * | 2/2002 | Glass | F25C 5/24 222/1 |
| 2004/0237563 | A1 * | 12/2004 | Lee et al. | 62/340 |
| 2006/0065008 | A1 | 3/2006 | Park | |
| 2006/0156526 | A1 * | 7/2006 | Tobler | 29/412 |
| 2006/0202071 | A1 * | 9/2006 | Jung et al. | 241/34 |
| 2008/0295536 | A1 * | 12/2008 | Kim et al. | 62/340 |
| 2010/0199701 | A1 * | 8/2010 | Yoon | F25C 5/185 62/344 |

FOREIGN PATENT DOCUMENTS

| | | | |
|---|---|---|---|
| CN | 1683851 | A5 | 10/2005 |
| DE | 2902853 | A5 | 10/1979 |
| DE | 2902853 | B1 | 10/1979 |
| EP | 1705438 | A5 | 9/2006 |
| GB | 1221140 | A5 | 2/1971 |
| JP | 50019067 | A5 | 2/1975 |
| JP | 50019067 | Y1 | 3/1975 |
| JP | 50022753 | A | 3/1975 |
| JP | 50022753 | A5 | 3/1975 |
| JP | 51146576 | A | 11/1976 |
| JP | 51146576 | A5 | 12/1976 |
| JP | 53155148 | A5 | 12/1978 |
| JP | 53155148 | U | 12/1978 |
| JP | 2005042938 | A | 2/2005 |
| JP | 2005042938 | A5 | 2/2005 |

OTHER PUBLICATIONS

International Search Report in International Application No. PCT/KR2007/005201, dated Apr. 10, 2008.

Extended European Search Report in European Application No. 07833510.6, dated Jan. 26, 2015, 6 pages.

International Search Report issued in Application No. PCT/KR2007/005201, mailed Apr. 10, 2008, 11 pages.

Korean Office Action issued in Application No. 10-2006-0103232, mailed Jul. 27, 2007, with English Translation, 8 pages.

* cited by examiner

REFRIGERATOR AND APPARATUS FOR ICE DISCHARGING THEREIN

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

*Notice: More than one reissue application has been filed for the reissue of U.S. Pat. No. 8,746,002. The reissue applications are U.S. application Ser. No. 15/954,114 (present application), filed on Apr. 16, 2018 which is a continuation reissue application of U.S. application Ser. No. 15/073,546, filed on Mar. 17, 2016, now U.S. Pat. No. RE46,794E, which is a reissue of U.S. Pat. No. 8,746,002.*

*CROSS-REFERENCE TO RELATED APPLICATION*

*This application is a reissue continuation of U.S. application Ser. No. 15/073,546, filed Mar. 17, 2016, now allowed, which is a reissue application of U.S. application Ser. No. 12/445,589, filed Apr. 15, 2009, now U.S. Pat. No. 8,746,002, issued Jun. 10, 2014, which is a § 371 national stage entry of PCT Application No. PCT/KR2007/005201, filed Oct. 23, 2007, and which claims the benefit of a foreign priority application filed in Korea as Serial No. 10-2006-0103232 on Oct. 24, 2006. This application claims priority to each of these prior applications.*

TECHNICAL FIELD

The present invention relates to a refrigerator and a device for ice discharging provided therein. More specifically, the present invention relates to a refrigerator and a device for ice discharging provided therein to discharge ice in a fixed amount by an improved structure of ice transfer.

BACKGROUND ART

Refrigerators are electric appliances to cool or freeze foodstuff in a refrigeration compartment and a freeze compartment by an evaporator and a heat-exchanger constituting a refrigeration cycle for supplying cool air or cold air.

Rather than the function of preserving foodstuff at a lower temperature, such refrigerators can make ice by using cold air at a temperature lower than a freezing temperature of water supplied to the freeze compartment. The ice may be dispensed in a state of an ice cube as it is or in a state of being crushed.

This ice dispensing function is performed by an icemaker exposed to cold air of the freeze compartment and an ice discharging device. The icemaker makes ice by using the cold air of the freeze compartment and the ice discharging device allows the ice made by the icemaker to discharge the ice in an ice cube shape or crushed shape selectively.

FIG. 1 is a diagram illustrating a conventional ice discharging device. As shown in FIG. 1, the conventional ice discharging device includes a case 10, an ice crushing unit 30, a motor 21, a shaft 22 and a transfer member 23. Ice supplied by an ice maker (not shown) is held in the case 10. The ice crushing unit 20 discharges the ice of the case 10 in ice cube or crushed shapes. The motor 21 drives the ice crushing unit 30 and the transfer member 23 is formed on the shaft 22 to transfer the ice of the case 10 to the ice crushing unit 30. The transfer member 23 has spiral wings having a predetermined section and it is formed along the circumference of the shaft 22.

An ice introduction opening 11 is provided at an upper portion of the case 10 and ice is introduced in the case 10 from an icemaker (not shown) through the opening 11. An ice discharge opening 12 is provided at a lower portion of the case 10 and the ice is discharged outside the case 10 through the ice discharge opening 12.

In such the conventional ice discharging device, the ice introduced through the ice introduction opening 11 is transferred toward the ice discharge opening 12 by the transfer member 23 rotating together with the rotation of the shaft 22. As a result, the ice may be discharged as it is (in this case, in an ice cube shape), or the ice is crushed by the ice crushing unit 30 and discharged (in this case, in a crushed ice shape).

FIGS. 2 and 3 are front views of the conventional ice discharging device illustrating the cases of discharging ice cube or crushed ice, respectively.

As shown in FIG. 2, if a user wishes crushed ice from the ice discharging device, the ice inside the case 10 is transferred to the ice discharge opening 12 by the transfer member 23 (see FIG. 1) and at this time a shutter 33 that is able to close some or entire portion of the ice discharge opening 12 is operated by a shutter driving unit 34 to close some portion of the ice discharge opening 12.

Hence, the transferred ice is not discharged through the ice discharge opening 12 and a rotary blade 32 of the ice crushing unit 30 rotates in a clockwise direction to move the ice toward a fixed blade 31. Hence, the ice is crushed by the interaction between the fixed blade 31 and the rotary blade 32 and the crushed ice is discharged through the ice discharge opening 12.

On the other hand, as shown in FIG. 3, if a user wishes an ice cube from the conventional ice discharging device, the ice inside the case 10 is transferred to the ice discharge opening 12 and the shutter driving unit 34 drives the shutter 33 to open the ice discharge opening 12 completely. Hence, the rotary blade 32 rotates in a counter-clockwise direction to push the ice with its no-blade portion and thus the ice cube is discharged through the ice discharge opening 12.

DISCLOSURE OF INVENTION

Technical Problem

However, the amount of discharged ice is not regular, that is not fixed, and thus a lots amount of ice might be discharged at a time when the user try to dispense the ice, because the ice pushed by the transfer member and the ice is discharged by opening or closing the shutter.

Further, in the conventional ice discharging device, the amount of pushed ice is not fixed. If a much amount of ice is pushed at a time, the ice might not be discharged smoothly because of a bottleneck state at the ice discharge opening and there might be an operational failure of the ice crushing unit. In addition, a malfunction of the ice discharging device might be caused by too much load on the operation unit of the ice discharging device.

Technical Solution

To solve the problems, an object of the present invention is to provide a refrigerator and a device for ice discharging.

To achieve these objects and other advantages and in accordance with the purpose of the invention, as embodied and broadly described herein, a device for ice discharging includes a case having an ice introduction opening and an ice discharge opening; a rotation member rotatable in the case to transfer ice that is held in a predetermined amount to be discharged; and a discharge adjustment part spaced apart a predetermined space from the rotation member to adjust the number of the ices transferred by the rotation member, such that a fixed amount of the ice is substantially discharged.

The rotation member includes a rotation shaft portion rotated by a power and at least one rotation wing portion formed radial at the rotation shaft portion to form an ice holding space.

The rotation wing portion includes a curvature wing portion with an end curved to the other end.

The rotation wing portion includes a bent wing portion having a bent portion.

The rotation member includes a rotation shaft portion rotated by a power and at least two linear wing portions formed radial at the rotation shaft portion. An ice holding space is formed between the linear wing portions.

The discharge adjustment part includes a fixed portion fixed at a side of the case to a predetermined length and a flexible adjustment portion connected with the fixed portion to be flexible upward and downward. The number of the ices held as the rotation member being rotated is adjusted by the flexible adjustment portion.

The discharge adjustment part includes a fixed portion fixed at a side of the case to a predetermined length, an adjustment flap coupled to the fixed part by a hinge to be able to move upward and downward and an elastic member to give elasticity to the upward and downward motion of the adjustment flap. The number of the ice held as the rotation member being rotated is adjusted by the elastic motion of the adjustment flap.

The device for ice discharging further includes a guide that is oblique from a side surface of the case to a bottom of the case, adjacent to the rotation member, to guide the ice introduced into the case to the rotation member.

The device for ice discharging further includes a rib provided at a rear surface of the rotation wing portion to prevent the ice from being discharged into space between the guide and the rotation member.

The device for ice discharging further includes an ice processing unit provided at the ice discharge opening to process the ice in a crushed shape or as it is.

The ice processing unit includes a housing provided at the ice discharge opening, an ice outlet formed at a lower end of the housing to discharge the ice outside, a shaft rotatable in the housing, at least one fixed blade fixed at the shaft and the housing, and a rotary blade rotated by the shaft to process the ice by an interaction with the fixed blade.

The device for ice discharging includes a motor installed inside or outside the case, a driving gear connected with the motor, coupled to either of the rotation member and the shaft to receive a power from the motor, a driven gear coupled to the other of the rotation member and the shaft to rotate with being engaged with the driving gear. The rotation member and the ice processing unit are controlled by controlling the single motor.

In another aspect, a refrigerator includes a body having a freezer compartment therein; a door to open and close the freezer compartment; an icemaker installed in at either of the freezer and the door to make ice; a device for ice discharging comprising a case to store the ice introduced therein, a rotation member rotatable in the case to transfer ice that is held in a predetermined amount to be discharged, and a discharge adjustment part spaced apart a predetermined space from the rotation member to adjust the number of the ices transferred by the rotation member, such that a fixed amount of the ice is substantially discharged; and a dispenser to dispense the ice discharged from the device for ice discharging outside the door.

Advantageous Effects

The present invention has following advantageous effects.

According to the refrigerator and the device for ice discharging, a fixed amount of ice may be substantially discharged, not discharged at a time. As a result, reliability of a product may be enhanced and a failure or malfunction of a product may be prevented.

BRIEF DESCRIPTION OF THE DRAWINGS

The accompanying drawings, which are included to provide further understanding of the disclosure and are incorporated in and constitute a part of this application, illustrate embodiments of the disclosure and together with the description serve to explain the principle of the disclosure.

In the drawings.

BEST MODE FOR CARRYING OUT THE INVENTION

Reference will now be made in detail to the specific embodiments of the present invention, examples of which are illustrated in the accompanying drawings. Wherever possible, the same reference numbers will be used throughout the drawings to refer to the same or like parts.

Figure 1:
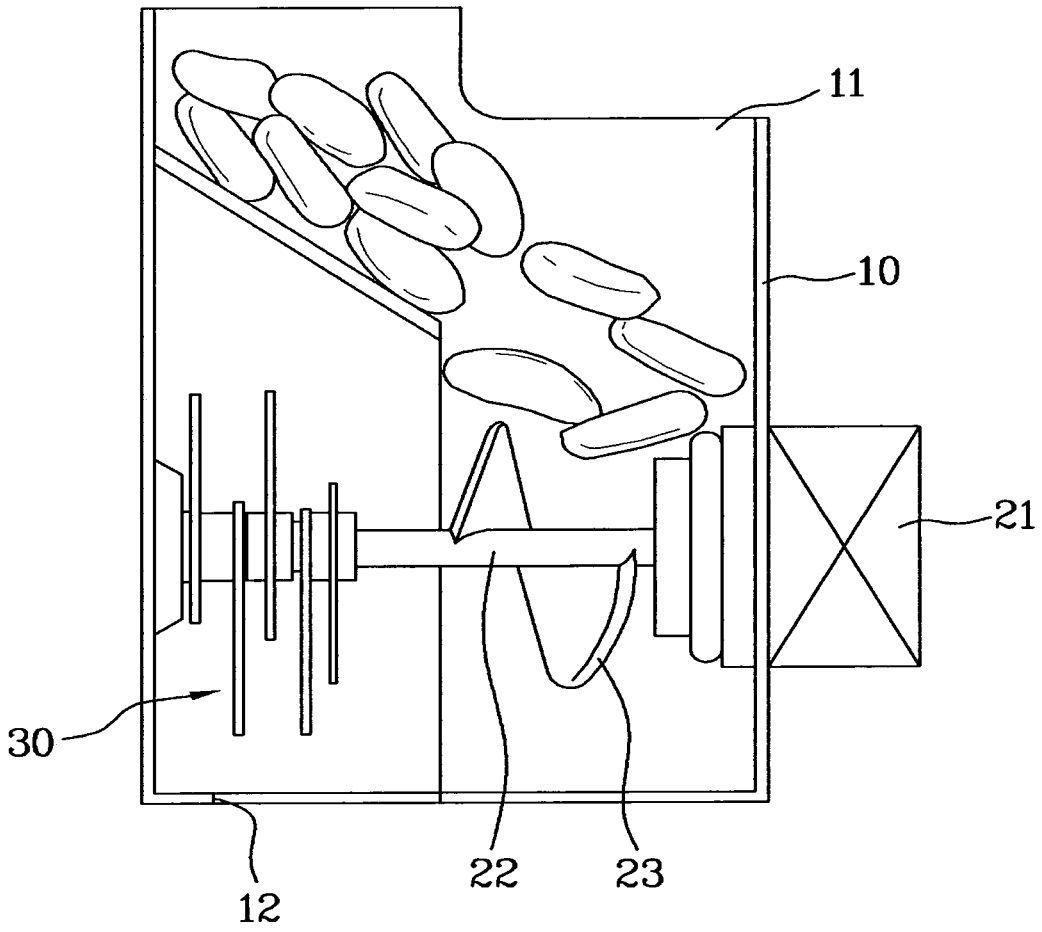
FIG. 1 is a diagram of a conventional ice discharging device.
Figure 2:
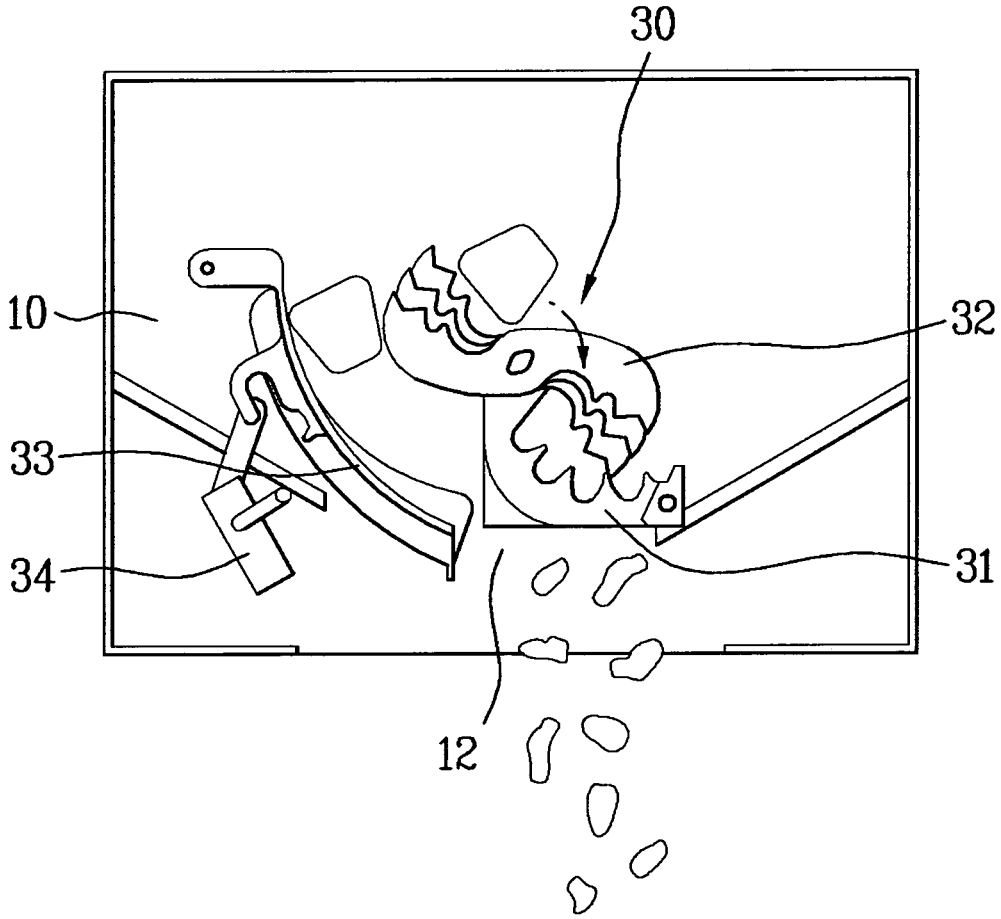
FIGS. 2 and 3 are front views illustrating cases of discharging ice cubes and crushed ice, respectively.
Figure 3:
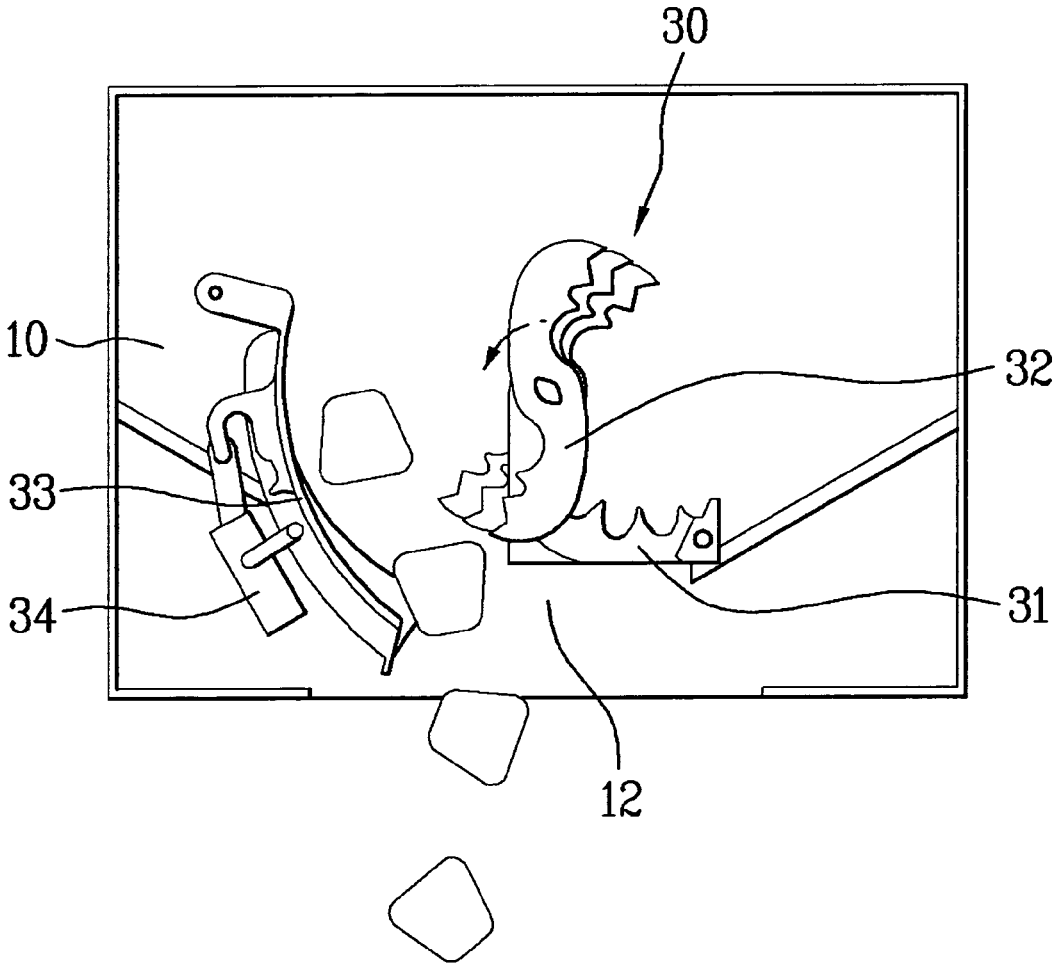
Figure 4:
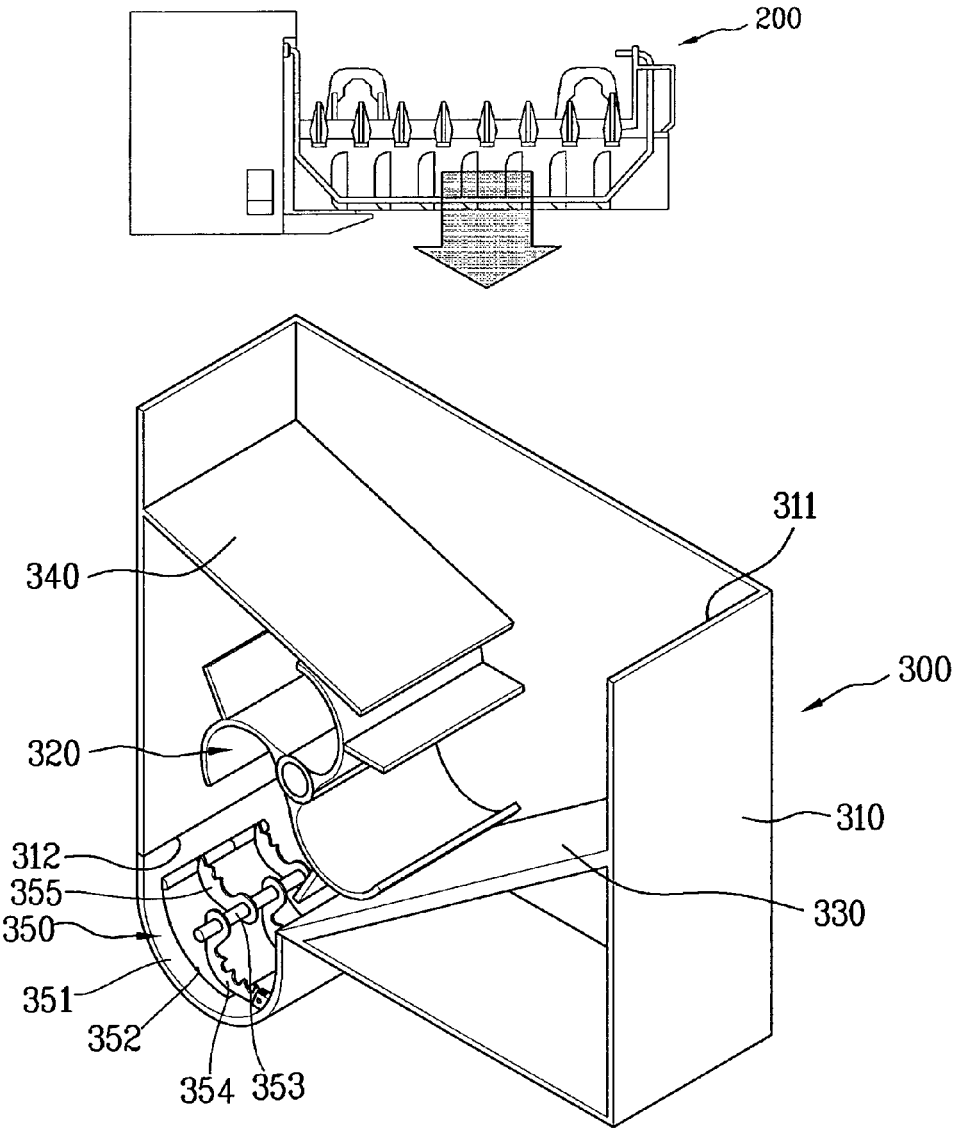
FIG. 4 is a perspective view illustrating a front of an ice discharging device according to the present invention.
Figure 5:
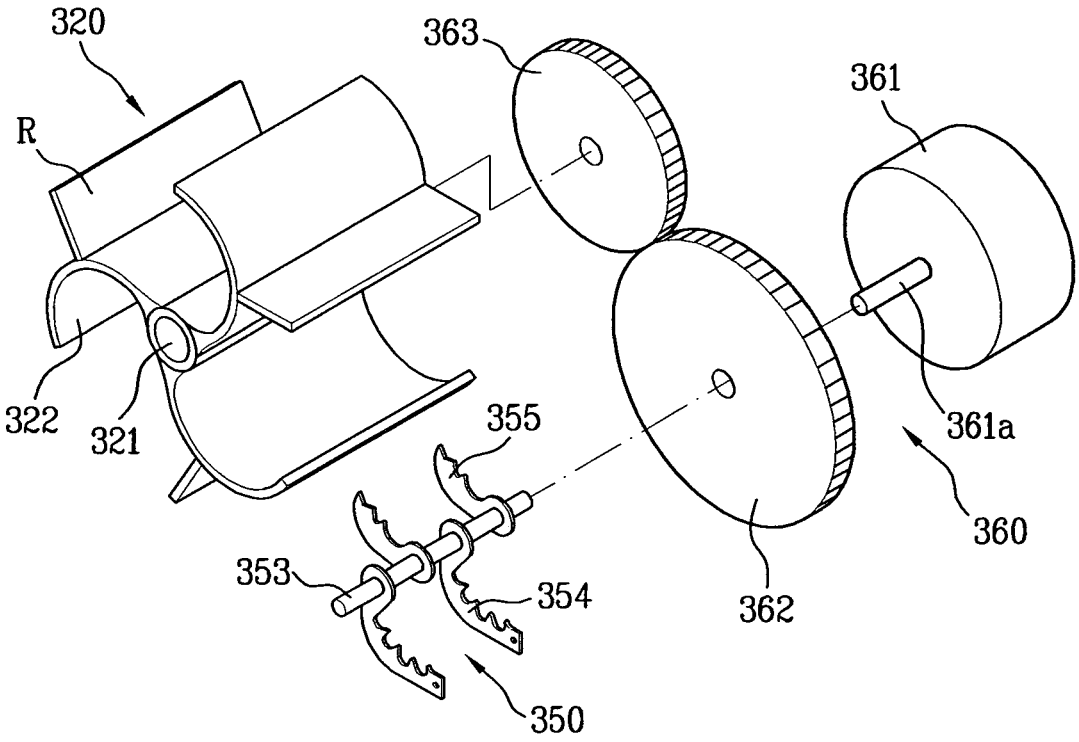
FIG. 5 is an exploded perspective view illustrating operational parts of the ice discharging device according to the present invention.

FIG. 4 is a perspective view illustrating a front of an ice discharging device according to the present invention, FIG. 5 is an exploded perspective view illustrating operational parts of the ice discharging device according to the present invention, and FIGS. 6 to 9 are diagrams illustrating exemplary embodiments of the ice discharging device according to the present invention, respectively.

Figure 12:
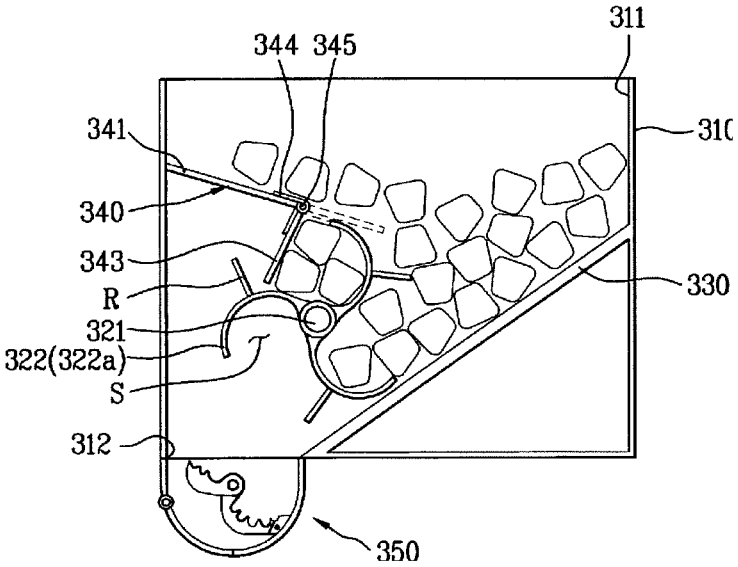
Figure 13:
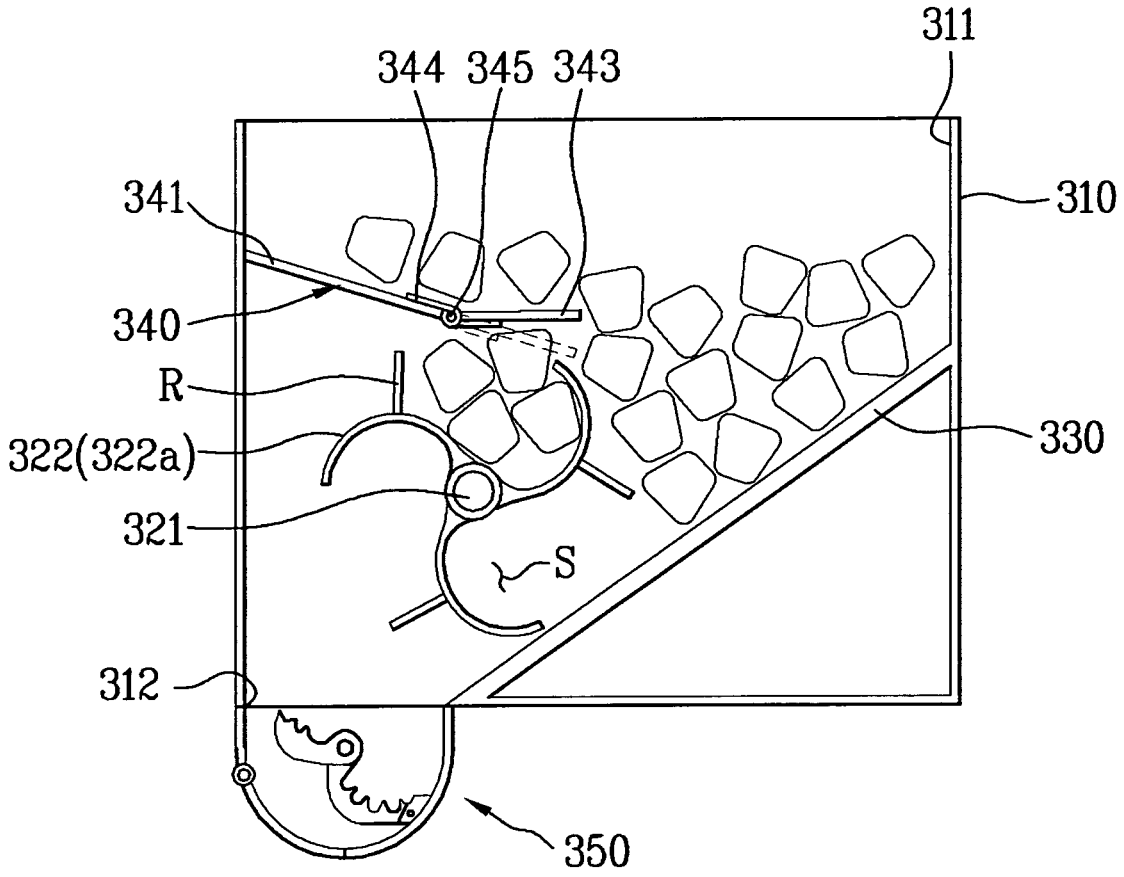
Figure 14:
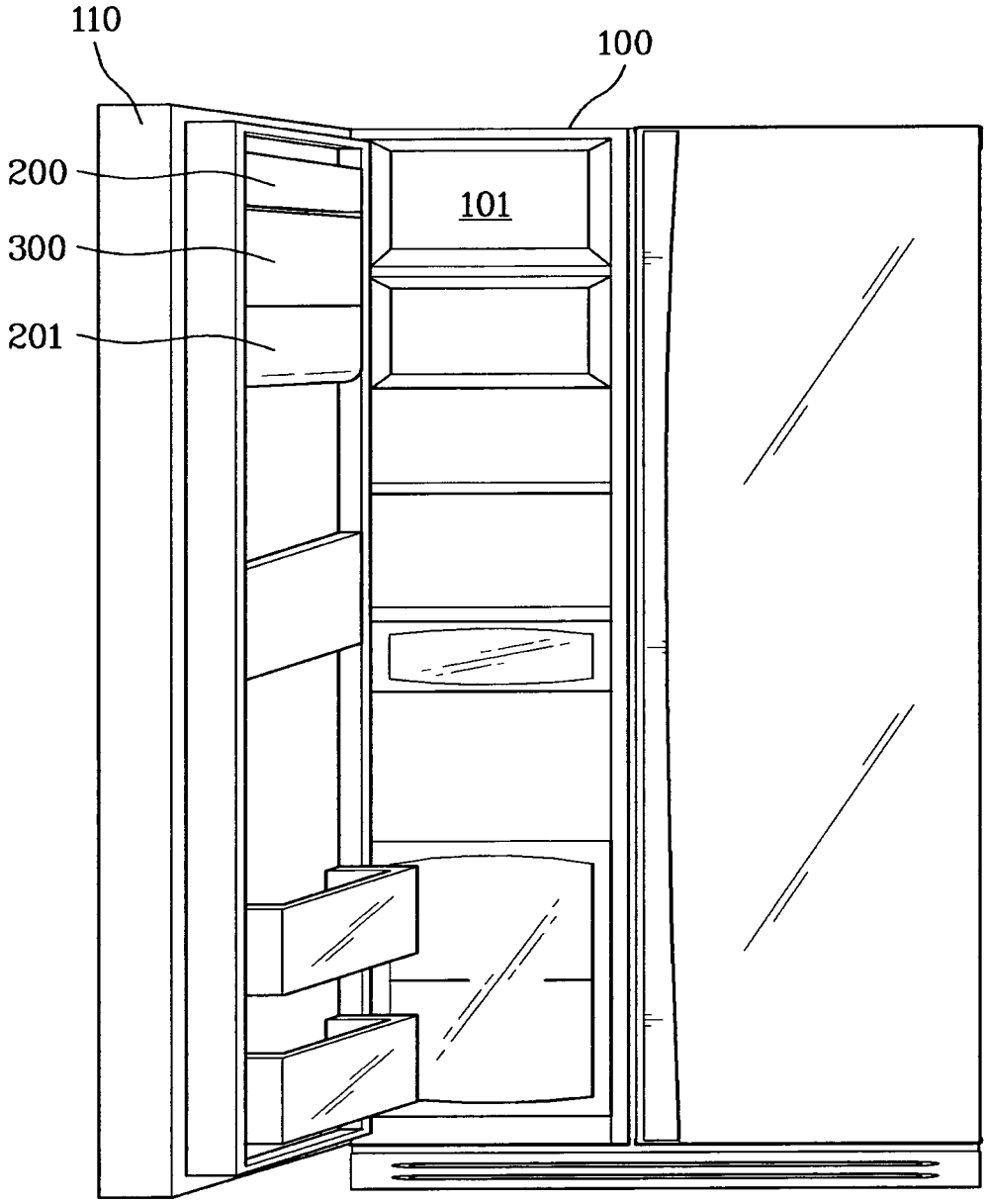
FIG. 14 is a diagram illustrating a refrigerator according to the present invention.

FIGS. 10 to 13 are diagrams illustrating an operation of an ice discharging device according to another exemplary embodiment of the present invention and FIG. 14 is a diagram illustrating a refrigerator according to the present invention.

The ice discharging device of the present invention may be applicable to all kinds of appliances having a structure of ice discharge such as a vending machine and a water purifier, as well as a refrigerator. Here, the ice discharging device applied to a refrigerator will be presented.

As shown in FIG. 14, a refrigerator according to the present invention includes a body 100, a freezer compartment 101, a door 110, an icemaker 200, an ice discharging device 300 and a dispenser. The freezer compartment 101 is provided in the body 100. The door 110 opens and closes the freezer compartment 101. The icemaker 200, the ice discharging device 300 and the dispenser 201 are to discharge ice and they are provided in an inner surface of the door 110 or a predetermined portion of the freezer compartment 101.

Even though the icemaker 200, the ice discharging device 300 and the dispenser 201 are provided at the door 110 or the freezer compartment 101, a user has to be provided ice in a state of the door 110 being closed. Thus, the dispenser 201 should be in communication with an outside.

FIGS. 4 to 13 illustrate the ice discharging device applied to the refrigerator more specifically. As shown in FIG. 4, the ice discharging device 300 includes a case 310, a rotation member 320 and a discharge adjustment part 340. The case 310 defines a predetermined space to hold the ice supplied by the icemaker 200. The rotation member 320 rotates to transfer a predetermined amount of the ice supplied to the case 310 toward an ice discharge opening 312. The discharge adjustment part 340 adjacent to the rotation member 230 allows the rotation member 320 to adjust the amount of ice, for the ice to be discharged at a fixed amount.

An upper portion of the case 310 is opened and the ice supplied by the icemaker 200 is introduced into the case 310. The ice discharge opening 312 is formed at an opened portion of a lower portion of the case 310.

The ice discharging device further includes a guide 330 formed opposite to the discharge adjustment part 340 in the case 310, being oblique from an inner side surface of the case 310 to the ice discharge opening 312 at a predetermined angle. The guide 330 guides the ice of the icemaker 200 to move to the rotation member 320.

An ice processing unit 350 is provided under the ice discharge opening 312 and the ice processing unit 350 includes a housing 351, an ice outlet 352, a shaft 353, a fixed blade 354 and a rotary blade 355. The housing 351 covers the ice discharge opening 312. The shaft 353 is rotatable within the housing 351. The fixed blade 354 is fixed on the shaft 353 and the rotary blade 355 rotates on the shaft 353.

If the rotation member 320 transfers the ice to the ice discharge opening 312, the ice is processed to be ice cubes or crushed ice by the ice processing unit 350 and the ice cubes or the crushed ice may be discharged.

In reference to FIG. 5, the rotation of the rotation member 320 and the shaft 353 will be explained.

As shown in FIG. 5, an operation unit 360 of the ice discharging device according to the present invention includes a motor 361, a driving gear 362 and a driven gear 363. The driving gear 362 is coupled to a motor shaft 361a of the motor 361 to rotate together with the motor 361. The driven gear 363 is engaged with the driving gear 362 to rotate together with the driving gear 362.

Either the shaft 353 of the ice processing unit 350 or a rotation shaft portion of the rotation member 320 is coupled to the driving gear 362, and the other of the two is coupled to the driven gear 363.

As a result, the ice processing unit 350 and the rotation member 320 may be controlled by the single operation of the motor 361 at the same time.

The rotation speed of both the rotation shaft portion 321 of the rotation member 320 and the shaft 353 of the ice processing unit 350 may be controlled according to the size of the driving gear 362 and driven gear 363 or the number of teeth. For example, if a larger driven gear than the driving gear (a driven gear having more teeth than the driving gear) is used, the driven gear rotates slower than the driving gear.

Although the driving gear 362 and the driven gear 363 are used as means for transmitting the driving force of the motor 361 as shown in FIG. 5, it is possible to use a driving pulley, a driven pulley and a power transmission belt connecting the driving pulley and the driven pulley to transmit a power.

In reference to FIGS. 6 to 9, exemplary embodiments of the ice discharging device according to the present invention will be explained. The ice discharging device according to each embodiment presented in FIGS. 6 to 9 has the same elements of the case 310, having the ice introduction opening 311 and the ice discharge opening 312, the discharge adjustment part 340, the guide 330 and the ice processing unit 350, which are identical to the embodiment shown in FIG. 4, and thus the detailed description thereof will be omitted except the rotation member 320.

Figure 6:
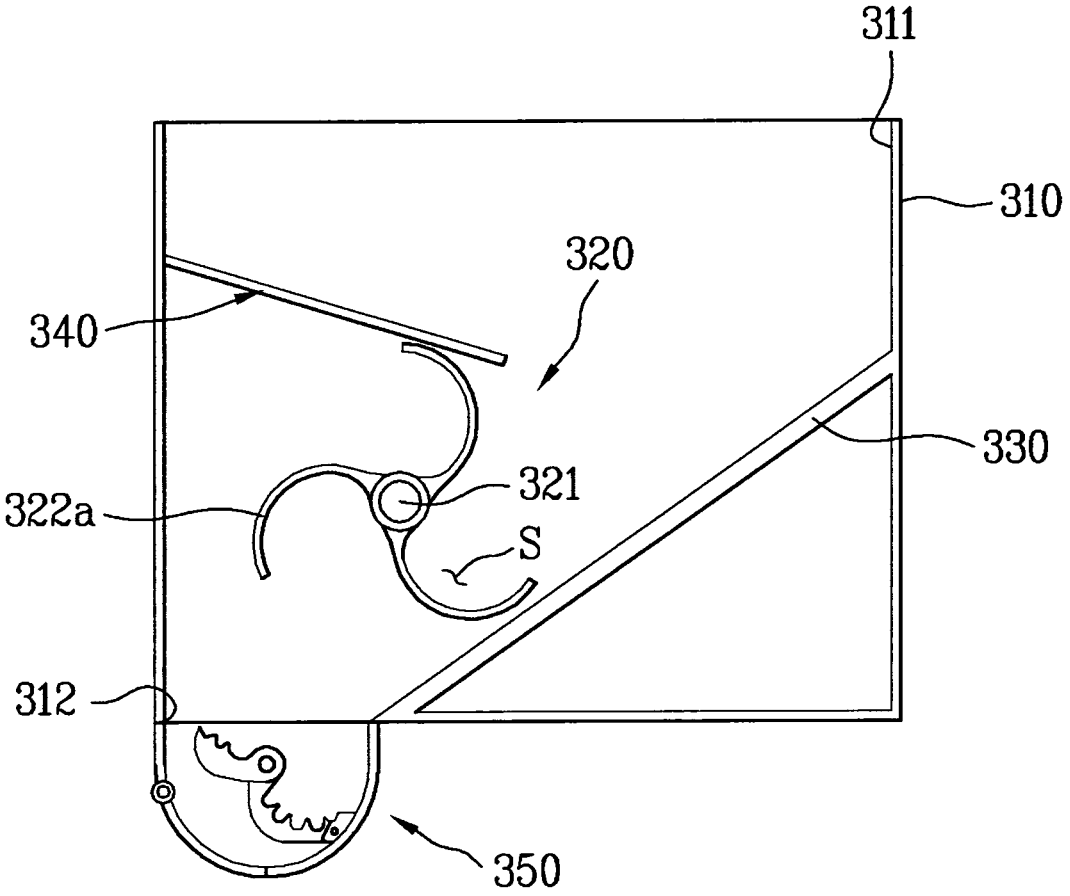
FIGS. 6 to 9 are diagrams illustrating exemplary embodiments of the ice discharging device according to the present invention, respectively.

In the embodiment shown in FIG. 6, the rotation member 320 includes a rotation shaft portion 321 rotated by the power of the motor 361 (see FIG. 5) and at least one rotation wing portion extending from or coupled to the rotation shaft portion 321. In FIG. 6, a curvature wing portion 322a is formed as an example of the rotation wing portion.

The curvature wing portion 322a is curved in a circular arc shape, that is, gently curved and an ice holding space (S) is formed in an inner space of the curved portion. As guided by the guide 330, the ice holding space (S) holds a predetermined amount of transferring ice and it is rotated by the rotation shaft portion 321 to transfer the ice.

Here, the ice held in the ice holding space (S) as the curvature wing portion 322a being rotated is contacted with the discharge adjustment part 340 and the discharge adjustment part 340 excludes the ice not held in the ice holding space to adjust the amount of ice, which will be explained later.

Figure 7:
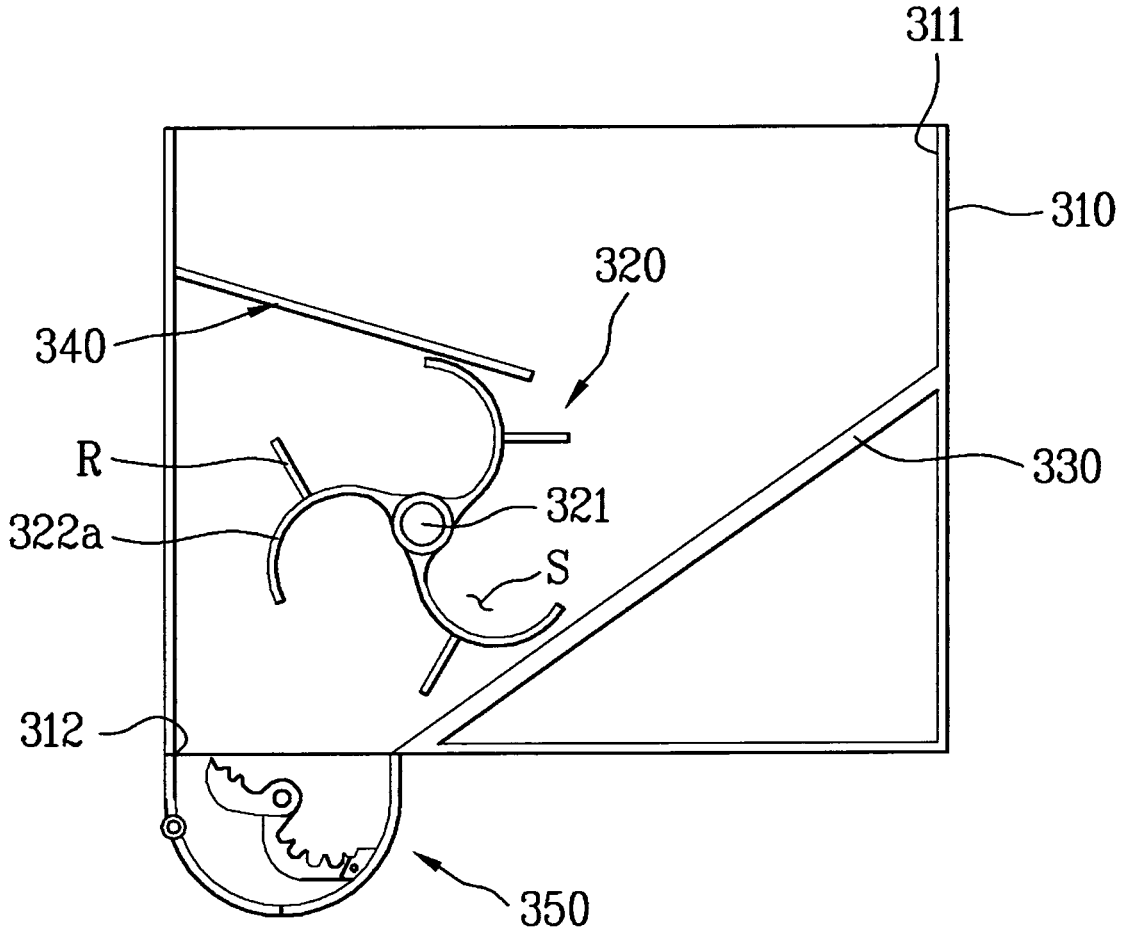

FIG. 7 shows another exemplary embodiment. The rotation member 320 shown in FIG. 7 also includes the rotation shaft portion 321 and the curvature wing portion 322a like the embodiment of FIG. 6. However, the embodiment of FIG. 7 includes at least one rib (R) extending from an opposite surface to a surface having the ice holding space (S) in a predetermined length to be perpendicular to a dotted extending line of the opposite surface.

The rib (R) prevents the ice from being discharged to space that is formed between the rotation member 320 and the guide 330, when the curvature wing portion 322a is rotated and passes the guide 330 before the curvature wing portion 322a comes to the guide 330.

The rib (R) may be formed of a hard material and it is preferable that the rib (R) is formed of a flexible material to be flexible when colliding against the guide 330 or the discharge adjustment part 340.

This rib (R) may be applicable to all the embodiments including a bent wing portion and linear wing portion, which will be explained later, as well as the curvature wing portion.

Figure 8:
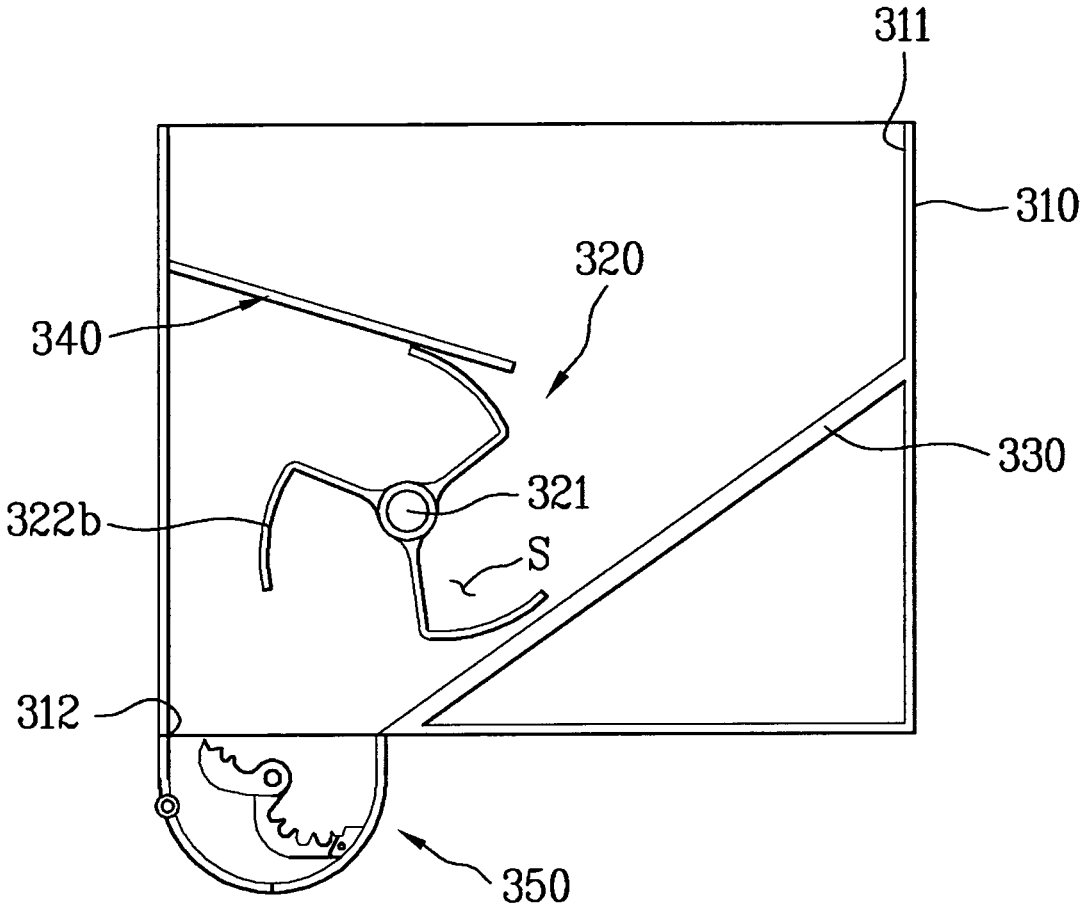

The rotation member 320 shown in FIG. 8 includes the rotation shaft portion 321 and at least one bent wing portion 322b rotated by the rotation shaft portion 321.

The bent wing portion 322b is bent and the ice holding space (S) is formed in an inner space formed by the bent portion. The ice holding space (S) is guided by the guide 330 to hold a predetermined amount of the transferring ice and it transfers the ice as being rotating by the rotation shaft portion 321.

Figure 9:
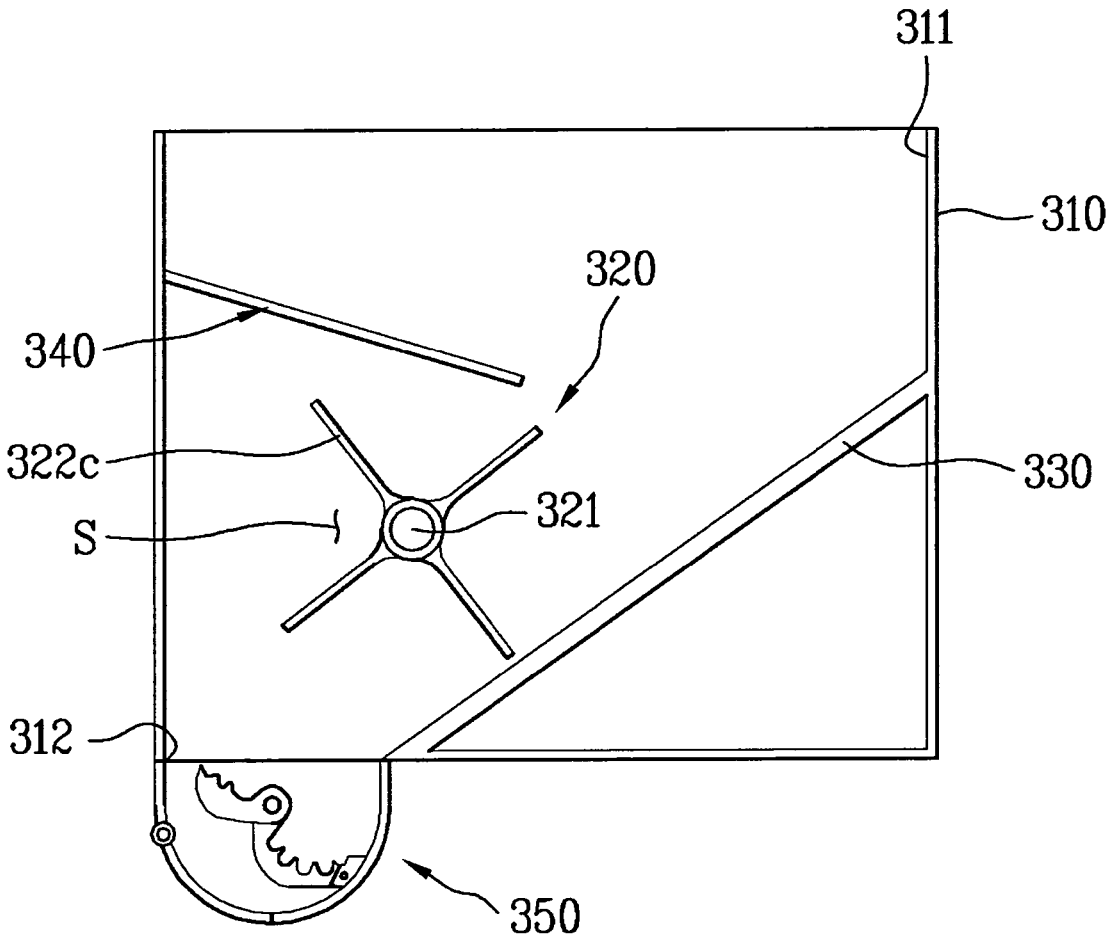

The rotation member 320 of an embodiment shown in FIG. 9 includes a linear wing portion 322c rotated by the rotation shaft portion 321. The linear wing portion 322c is formed linear and at least two linear wing portions 322c form the ice holding space (S) to hold a predetermined amount of the ice guided by the guide 330.

In reference to FIGS. 10 to 13, the discharge adjustment part 340 of the ice discharging device and an operation of the ice discharging device will be explained. Each embodiment shown in FIGS. 10 to 13 presents the curvature wing portion 322a as an example of the rotation wing portion 322 and the rib (R). Here the bent wing portion and the linear wing portion may be applicable.

The ice discharging device according to each embodiment of the present invention shown in FIGS. 10 to 13 also includes the case 310 having the ice introduction opening 311 and the ice discharge opening 312, the rotation member 320, the guide 330 and the ice processing unit 350 like FIGS. 4 to 9. Thus, the detailed description of the identical elements will be omitted but the discharge adjustment part 340 will be explained.

Figure 10:
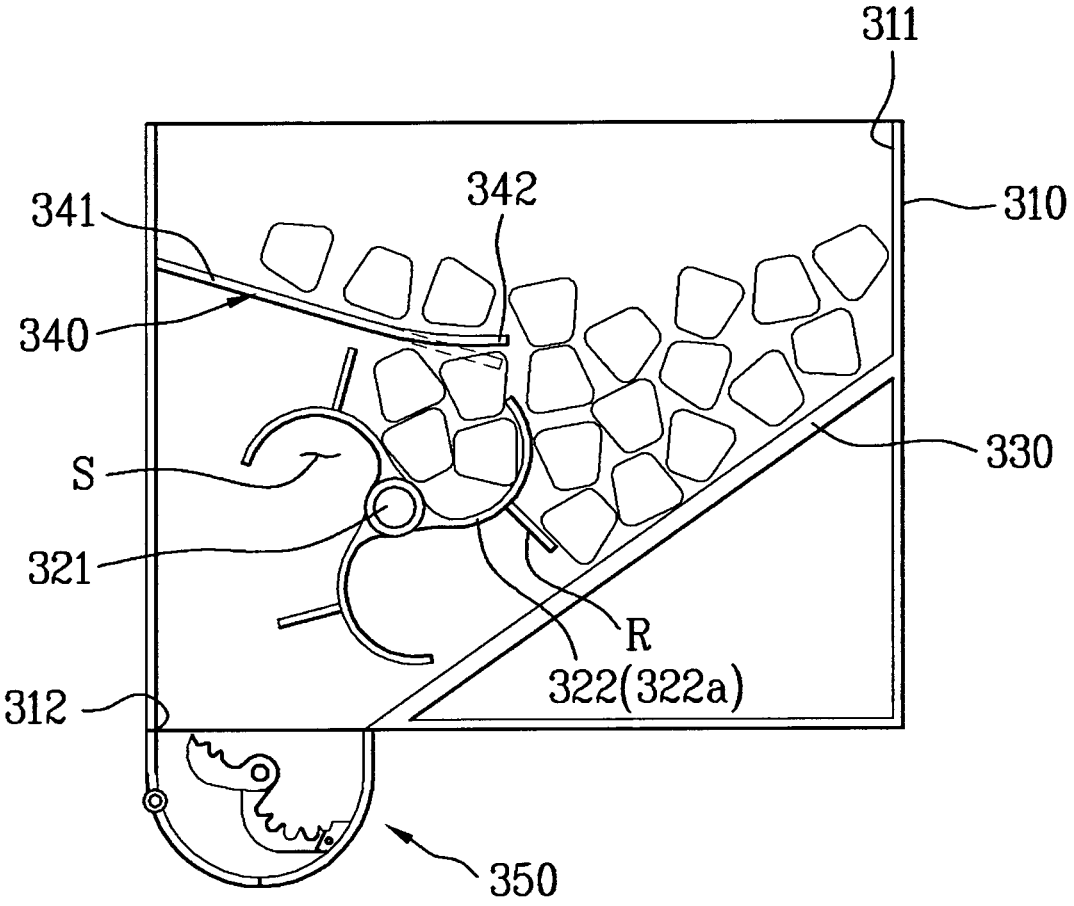
FIGS. 10 to 13 are diagrams illustrating an operation of an ice discharging device according to another exemplary embodiment of the present invention.
Figure 11:
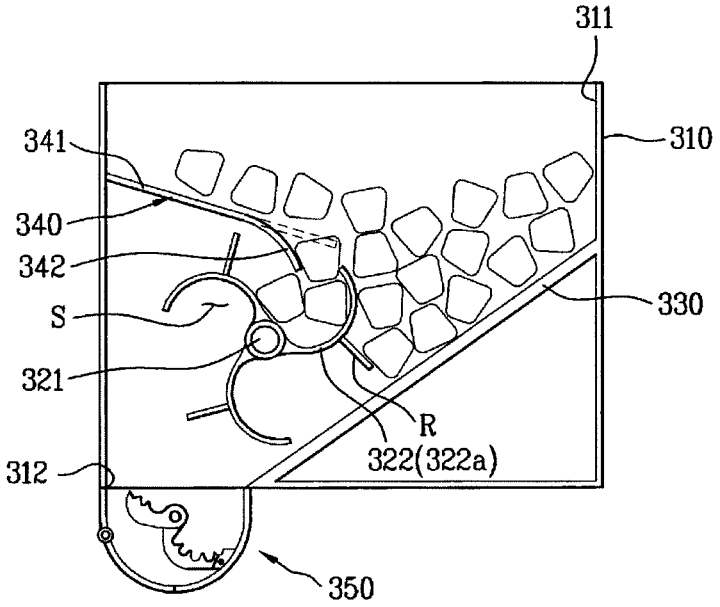

According to the embodiment shown in FIGS. 10 and 11, the discharge adjustment part 340 includes a fixed portion 341 and a flexible adjustment portion 342. The fixed portion 341 is fixed oblique at an inner side surface of the case 310 to a predetermined length. The flexible adjustment portion 342 is movable upward and downward, having elasticity from the fixed portion 341 to an end of the discharge adjustment part 340. The flexible adjustment portion 341 is adjacent to the rotation wing portion 322.

The flexible adjustment portion 342 may be extending from the fixed portion 341 as one body or may be formed separately to be coupled to the fixed portion 341.

An operation of the ice discharging device shown in FIGS. 10 and 11 will be explained.

If the ice is introduced into the case 310 by the icemaker, the ice is transferred along the guide 330 and a predetermined amount of the ice is held in the ice holding space (S) of the rotation wing portion 322.

As the rotation shaft portion 321 is rotated in a counter-clockwise direction, the ice held in the ice holding space (S) is rotated in a counter-clockwise direction, too. At this time, the flexible adjustment portion 342 adjacent to the rotation wing portion 322 is contacted with the held ice and it moves upward and downward to adjust the number of the ices, which results in substantially discharging a fixed amount of the ice.

FIG. 10 shows that the flexible adjustment portion 342 contacted with the ice moves upward to adjust the amount of the ice and FIG. 11 shows that the flexible adjustment portion 342 contacted with the ice moves downward to adjust the amount of the ice.

It is also possible that the rotation member is rotated in an opposite direction to adjust the amount of the ice. specifically, if the rotation shaft portion 321 is rotated in a clockwise direction as shown in FIGS. 10 and 11, the rotation wing portion 322 limits the ice from moving toward the ice discharge opening 312 along the guide 330 to adjust the amount of the ice.

On the other hand, an embodiment shown in FIGS. 12 and 13 and an operation thereof will be explained. As shown in FIGS. 12 and 13, the discharge adjustment part 340 includes the fixed portion 341 and an adjustment flap 343. The fixed portion 341 is fixed oblique at an inner surface of the case 310 to a predetermined length. The adjustment flap 343 is rotatably coupled to an end of the fixed portion 341.

The adjustment flap 343 is rotatably coupled to the fixed portion 341 by a hinge 345 and it includes a spring 344 to give elasticity to the motion of the adjustment flap 343.

An end of the spring 344 is fixed at the fixed portion 341 and the other end is fixed at the adjustment flap 343 to create elastic restitution by the motion of the adjustment flap 343. As a result, the adjustment flap 343 can move upward and downward elastically.

In reference to FIGS. 12 and 13, an operation of the ice discharging device having the discharge adjustment part 340 by the adjustment flap 343 will be explained. If the ice is introduced into the case 310 by the icemaker, the ice is transferred along the guide 330 and the predetermined amount of the ice is held in the ice holding space (S) of the rotation wing portion 322 of the rotation member.

As the rotation shaft portion 321 is rotated in a counter-clockwise direction, the ice held in the ice holding space (S) is also rotated in a counter-clockwise direction. At this time, the adjustment flap 343 of the discharge adjust part 340 adjacent to the rotation wing portion 322 is contacted with the held ice and the adjustment flap 343 moves upward and downward to adjust the amount of the ice, which results in substantial discharging of the fixed amount of the ice.

FIG. 12 shows that the adjustment flap 343 contacted with the ice moves downward to adjust the number of the ices and FIG. 13 shows that the adjustment flap 343 contacted with the ice moves upward to adjust the number of the ices.

It is also possible that the rotation member can adjust the number of the ices as being rotated in an opposite direction. Specifically, if the rotation shaft portion 321 is rotated in a clockwise direction as shown in FIGS. 12 and 13, the rotation wing portion 322 limits the ice from moving toward the ice discharge opening 312 along the guide 330 to adjust the amount of the ice.

In reference to FIGS. 11 to 13, if the substantially fixed amount of the ice is transferred to the ice discharge opening 312 by the operation of the ice discharging device, the ice processing unit 350 provided under the ice discharge opening 312 processes the ice to be discharged as it is or in crushed shapes.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

INDUSTRIAL APPLICABILITY

The present invention has an industrial applicability.

According to the refrigerator and the device for ice discharging, a fixed amount of ice may be substantially discharged, not discharged at a time. As a result, reliability of a product may be enhanced and a failure or malfunction of a product may be prevented.

The invention claimed is:

[1. A device for ice discharging provided in a refrigerator door comprising:

a case having an ice introduction opening at an upper portion and an ice discharge opening at a lower portion;

a rotation member rotatable in the case to transfer ice that is held in a predetermined amount to be discharged by rotation thereof, wherein the rotation member comprises:

a rotation shaft portion rotated by electrical power, and at least one rotation wing portion that extends radially from the rotation shaft portion, that is a plate parallel to the rotation shaft, and that defines an ice holding space;

a discharge adjustment part that extends from a first inner side surface of the case to a position over a rotation contour of the at least one rotation wing portion and that adjusts the number of the ices transferred by the rotation member in the ice holding space, such that a fixed amount of the ice is substantially discharged; and a guide that is positioned opposite to the discharge adjustment part in the case such that the rotation member is positioned between the discharge adjustment part and the guide, that extends from a second inner side surface of the case to a position under a rotation contour of the at least one rotation wing portion, that is oblique from the second inner side surface of the case to a bottom of the case, that is adjacent to the rotation member, and that guides ice introduced into the case to the rotation member, the second inner side surface being opposite of the first inner side surface, wherein, as the rotation member rotates:

the rotation wing portion contacts ice pieces guided by the guide, the rotation wing portion rotates the ice pieces toward the discharge adjustment part, the discharge adjustment part contacts at least one of the ice pieces being rotated and moves upward and downward to adjust the number of the ice pieces in the ice holding space defined by the rotation wing portion to the fixed amount of the ice, and the rotation wing portion moves the fixed amount of ice in the ice holding space downward from the discharge adjustment part to the ice discharge opening.]

[2. The device for ice discharging as claimed in claim 1, wherein the rotation wing portion comprises a curvature wing portion with an end curved to the other end.]

[3. The device for ice discharging as claimed in claim 1, wherein the rotation wing portion comprises a bent wing portion having a bent portion.]

[4. The device for ice discharging as claimed in claim 1, wherein the rotation member comprises, a rotation shaft portion rotated by a power, and at least two linear wing portions formed radial at the rotation shaft portion, further wherein an ice holding space is formed between the linear wing portions.]

[5. The device for ice discharging as claimed in claim 1, wherein the discharge adjustment part comprises, a fixed portion fixed at a side of the case to a predetermined length, and a flexible adjustment portion connected with the fixed portion to be flexible upward and downward, further wherein the number of the ices held as the rotation member being rotated is adjusted by the flexible adjustment portion.]

[6. The device for ice discharging as claimed in claim 1, wherein the discharge adjustment part comprises, a fixed portion fixed at a side of the case to a predetermined length, an adjustment flap coupled to the fixed part by a hinge to be able to move upward and downward, and an elastic member to give elasticity to the upward and downward motion of the adjustment flap, further wherein the number of the ice held as the rotation member being rotated is adjusted by the elastic motion of the adjustment flap.]

[7. The device for ice discharging as claimed in claim 1, further comprising a rib provided at a rear surface of a rotation wing portion to prevent the ice from being discharged into space between the guide and the rotation member.]

[8. The device for ice discharging as claimed in claim 1, further comprising an ice processing unit provided at the ice discharge opening to process the ice in a crushed shape or as it is, the ice processing unit being configured to process ice after the ice has been moved by the rotation member past the discharge adjustment part.]

[9. The device for ice discharging as claimed in claim 8, wherein the ice processing unit comprises, a housing provided at the ice discharge opening, an ice outlet formed at a lower end of the housing to discharge the ice outside, a shaft rotatable in the housing, at least one fixed blade fixed at the shaft and the housing, and a rotary blade rotated by the shaft to process the ice by an interaction with the fixed blade.]

[10. The device for ice discharging as claimed in claim 9, comprising:

a motor installed inside or outside the case, a driving gear connected with the motor, coupled to either of the rotation member and the shaft to receive a power from the motor, a driven gear coupled to the other of the rotation member and the shaft to rotate with being engaged with the driving gear, wherein the rotation member and the ice processing unit are controlled by the control of the single motor.]

[11. The device for ice discharging as claimed in claim 1, wherein the discharge adjustment part is positioned above the rotation member and the-guide is positioned below the rotation member.]

[12. The device for ice discharging as claimed in claim 1, wherein the discharge adjustment part adjusts a number of ice pieces that the rotation member carries as the rotation member rotates to a position at which the carried ice pieces fall out of the rotation member toward the ice discharge opening based on force of gravity.]

[13. A refrigerator comprising:

a body having a compartment therein;

a door to open and close the compartment;

an icemaker installed in the door and configured to make ice;

a device for ice discharging provided in the door comprising:

a case having an ice introduction opening at an upper portion and an ice discharge opening at a lower portion, a rotation member rotatable in the case to transfer ice that is held in a predetermined amount to be discharged by rotation thereof, wherein the rotation member comprises:

a rotation shaft portion rotated by electrical power, and at least one rotation wing portion that extends radially from the rotation shaft portion, that is a plate parallel to the rotation shaft portion, and that defines an ice holding space, a discharge adjustment part that extends from a first inner side surface of the case to a position over a rotation contour of the at least one rotation wing portion and that adjusts the number of the ices transferred by the rotation member in the ice holding space, such that a fixed amount of the ice is substantially discharged, and a guide that is positioned opposite to the discharge adjustment part in the case such that the rotation member is positioned between the discharge adjustment part and the guide, that extends from a second inner side surface of the case to a position under a rotation contour of the at least one rotation wing portion, that is oblique from the second inner side surface of the case to a bottom of the case, that is adjacent to the rotation member, and that guides ice introduced into the case to the rotation member, the second inner side surface being opposite of the first inner side surface; and a dispenser to dispense the ice discharged from the device for ice discharging outside the door, wherein, as the rotation member rotates:

the rotation wing portion contacts ice pieces guided by the guide, the rotation wing portion rotates the ice pieces toward the discharge adjustment part, the discharge adjustment part contacts at least one of the ice pieces being rotated and moves upward and downward to adjust the number of the ice pieces in the ice holding space defined by the rotation wing portion to the fixed amount of the ice, and the rotation wing portion moves the fixed amount of ice in the ice holding space downward from the discharge adjustment part to the ice discharge opening.]

[14. The refrigerator as claimed in claim 13, wherein the rotation wing portion comprises a curvature wing portion with an end curved to the other end.]

[15. The refrigerator as claimed in claim 13, wherein the rotation wing portion comprises a bent wing portion having a bent portion.]

[16. The refrigerator as claimed in claim 13, wherein the discharge adjustment part comprises, a fixed portion fixed at a side of the case to a predetermined length, and a flexible adjustment portion connected with the fixed portion to be flexible upward and downward, further wherein the number of the ices held as the rotation member being rotated is adjusted by the flexible adjustment portion.]

[17. The refrigerator as claimed in claim 13, wherein the discharge adjustment part comprises, a fixed portion fixed at a side of the case to a predetermined length, an adjustment flap coupled to the fixed part by a hinge to be able to move upward and downward, and an elastic member to give elasticity to the upward and downward motion of the adjustment flap, further wherein the number of the ice held as the rotation member being rotated is adjusted by the elastic motion of the adjustment flap.]

[18. The refrigerator as claimed in claim 13, further comprising a rib provided at a rear surface of a rotation wing portion to prevent the ice from being discharged into space between the guide and the rotation member.]

[19. The refrigerator as claimed in claim 13, further comprising an ice processing unit provided at the ice discharge opening to process the ice in a crushed shape or as it is, the ice processing unit being configured to process ice after the ice has been moved by the rotation member past the discharge adjustment part.]

*20. A device for ice discharging provided in a refrigerator door comprising:*

*a case having an ice introduction opening at an upper portion and an ice discharge opening at a lower portion;*

*a rotation member configured to rotate in the case to transfer ice by rotation thereof, wherein the rotation member comprises:*

*a rotation shaft portion rotated by electrical power, and*

*at least one rotation wing portion that extends radially from the rotation shaft portion, the at least one rotation wing portion comprising a plurality of plates that extend radially from the rotation shaft, and that define an ice holding space;*

*a discharge adjustment part that extends from a first side surface of the case to a position over a rotation contour of the at least one rotation wing portion and that adjusts the number of the ices transferred by the rotation member in the ice holding space, such that an amount of the ice is discharged; and*

*a guide that is positioned opposite to the discharge adjustment part in the case such that the rotation member is positioned between the discharge adjustment part and the guide, that extends from a second inner side surface of the case to a position under a rotation contour of the at least one rotation wing portion, that is oblique from the second inner side surface of the case to a bottom of the case, that is adjacent to the rotation member, and that guides ice introduced into the case to the rotation member, the second inner side surface being opposite of the first inner side surface,*

*wherein, as the rotation member rotates:*

*the at least one rotation wing portion contacts ice pieces guided by the guide,*

*the at least one rotation wing portion rotates the ice pieces toward the discharge adjustment part,*

*the discharge adjustment part contacts at least one of the ice pieces being rotated to adjust the number of the ice pieces in the ice holding space defined by the at least one rotation wing portion to the amount of the ice, and*

*the at least one rotation wing portion moves the amount of ice in the ice holding space downward from the discharge adjustment part to the ice discharge opening.*

*21. The device of claim 20, wherein:*

*the discharge adjustment part contacts at least one of the ice pieces being rotated and defines a space between the discharge adjustment part and the at least one rotation wing portion such that the space changes in size to adjust the number of the ice pieces in the ice holding space defined by the at least one rotation wing portion.*

*22. The device of claim 20, wherein:*

*the discharge adjustment part contacts at least one of the ice pieces being rotated and guides the contacted at least one of the ice pieces out of the ice holding space to adjust the number of the ice pieces in the ice holding space defined by the at least one rotation wing portion.*

*23. The device of claim 20, wherein:*

*the device is configured such that ice is transferred from the ice introduction opening at the upper portion to the rotation member by dropping from the ice introduction opening down to the rotation member.*

*24. A refrigerator comprising:*

*a body having a compartment therein;*

*a door to open and close the compartment;*

*an icemaker installed in the door and configured to make ice;*

*a device for ice discharging provided in the door comprising:*

*a case having an ice introduction opening at an upper portion and an ice discharge opening at a lower portion,*

*a rotation member configured to rotate in the case to transfer ice by rotation thereof, wherein the rotation member comprises:*

*a rotation shaft portion rotated by electrical power, and*

*at least one rotation wing portion that extends radially from the rotation shaft portion, the at least one rotation wing portion comprising a plurality of plates that extend radially from the rotation shaft portion, and that define an ice holding space;*

*a discharge adjustment part that extends from a first side surface of the case to a position over a rotation contour of the at least one rotation wing portion and that adjusts the number of the ices transferred by the rotation member in the ice holding space, such that an amount of the ice is discharged; and*

*a guide that is positioned opposite to the discharge adjustment part in the case such that the rotation member is positioned between the discharge adjustment part and the guide, that extends from a second inner side surface of the case to a position under a rotation contour of the at least one rotation wing portion, that is oblique from the second inner side surface of the case to a bottom of the case, that is adjacent to the rotation member, and that guides ice introduced into the case to the rotation member, the second inner side surface being opposite of the first inner side surface,*

*a dispenser to dispense the ice discharged from the device for ice discharging outside the door,*

*wherein, as the rotation member rotates:*

*the at least one rotation wing portion contacts ice pieces guided by the guide,*

*the at least one rotation wing portion rotates the ice pieces toward the discharge adjustment part,*

*the discharge adjustment part contacts at least one of the ice pieces being rotated to adjust the number of the ice pieces in the ice holding space defined by the at least one rotation wing portion to the amount of the ice, and*

*the at least one rotation wing portion moves the amount of ice in the ice holding space downward from the discharge adjustment part to the ice discharge opening.*

* * * * *